(12) United States Patent
Gentric

(10) Patent No.: US 7,936,936 B2
(45) Date of Patent: May 3, 2011

(54) METHOD OF VISUALIZING A LARGE STILL PICTURE ON A SMALL-SIZE DISPLAY

(75) Inventor: Philippe Gentric, Fourqueux (FR)

(73) Assignee: NXP B.V., Eindhoven (NL)

( * ) Notice: Subject to any disclaimer, the term of this patent is extended or adjusted under 35 U.S.C. 154(b) by 975 days.

(21) Appl. No.: 10/597,973

(22) PCT Filed: Feb. 9, 2005

(86) PCT No.: PCT/IB2005/000337
§ 371 (c)(1),
(2), (4) Date: Aug. 15, 2006

(87) PCT Pub. No.: WO2005/084005
PCT Pub. Date: Sep. 9, 2005

(65) Prior Publication Data
US 2008/0151336 A1 Jun. 26, 2008

(30) Foreign Application Priority Data
Feb. 17, 2004 (EP) .................................. 04300084

(51) Int. Cl.
*G06K 9/36* (2006.01)
*H04N 1/393* (2006.01)
*G06K 9/46* (2006.01)

(52) U.S. Cl. ....................................... 382/238; 358/528

(58) Field of Classification Search .................. 382/104, 382/162, 164, 173, 178, 224, 232, 233, 238–240, 382/243; 375/240.12, 240.13, 240.23, 240.24, 375/240.26; 345/328, 355; 358/528; 341/65, 341/67
See application file for complete search history.

(56) References Cited

U.S. PATENT DOCUMENTS

| | | | | |
|---|---|---|---|---|
| 5,552,829 A | * | 9/1996 | Kim et al. | 375/240.23 |
| 5,963,203 A | * | 10/1999 | Goldberg et al. | 715/723 |
| 6,091,833 A | * | 7/2000 | Yasui et al. | 382/104 |
| 6,377,622 B1 | * | 4/2002 | Kim et al. | 375/240 |
| 6,426,975 B1 | * | 7/2002 | Nishi et al. | 375/240.13 |
| 6,684,087 B1 | | 1/2004 | Yu et al. | |
| 7,206,456 B2 | * | 4/2007 | Hannuksela et al. | 382/243 |
| 7,388,916 B2 | * | 6/2008 | Park et al. | 375/240.26 |
| 2001/0017942 A1 | | 8/2001 | Kalevo et al. | |
| 2002/0092029 A1 | | 7/2002 | Smith | |
| 2002/0101992 A1 | | 8/2002 | Laaksonen | |
| 2005/0068208 A1 | * | 3/2005 | Liang et al. | 341/65 |
| 2006/0159355 A1 | * | 7/2006 | Mizuno | 382/239 |
| 2008/0151336 A1 | * | 6/2008 | Gentric | 358/528 |

FOREIGN PATENT DOCUMENTS

| | | |
|---|---|---|
| CN | 1273499 A | 11/2000 |
| CN | 1418436 A | 5/2003 |
| EP | 1 050 846 A2 | 11/2000 |
| EP | 1162810 A2 | 12/2001 |
| EP | 1220157 A2 | 12/2001 |
| EP | 1220157 A2 | 7/2002 |

(Continued)

*Primary Examiner* — Amir Alavi

(57) ABSTRACT

A method of visualizing a large still picture on a display having a size smaller than the large still picture includes the steps of dividing the large still picture into a set of pieces, where the pieces have a size substantially equal to the display size; ranking the pieces of the large still picture according to a predetermined scanning order; and encoding the set of pieces using a predictive block-based compression technique according to the predetermined scanning order so as to obtain a video sequence.

10 Claims, 2 Drawing Sheets

FOREIGN PATENT DOCUMENTS

| | | |
|---|---|---|
| JP | 09-325755 | 12/1997 |
| JP | 2002-051342 A | 2/2002 |
| JP | 2003-069759 A | 3/2003 |
| JP | 2004-133443 A | 4/2004 |
| JP | 2005-092007 A | 4/2005 |
| WO | 01/54416 A1 | 7/2001 |

* cited by examiner

METHOD OF VISUALIZING A LARGE STILL PICTURE ON A SMALL-SIZE DISPLAY

FIELD OF THE INVENTION

This application is a 371 of PCT/IB2005/000337 filed on Feb. 9, 2005.

The present invention relates to a method of and a device for visualizing a large still picture on a display having a size smaller than the large still picture.

It may be used, for example, in mobile apparatuses, such as a mobile phone or a personal digital assistant PDA, comprising a display having a reduced size.

BACKGROUND OF THE INVENTION

The European patent application number EP 1162810 discloses a conversion method in which the moving image data distribution processing is used to split a still image into multiple pieces, to extend each piece to produce a plurality of still images and, from the extended still images, to create data in the continuous still image display format. Continuous display of the pieces created by splitting the still image allows the user viewing the entire image on a small-size screen, such as that of a mobile phone, without having to reduce the image.

However, such a process is done at a server side, said server sending the sequence of pieces of the still image to a mobile phone in accordance with the requests of the user of said mobile phone, said requests being made interactively using a cursor. In other words, the user does not receive a video sequence as such but independent pieces of the still image as a function of its requests. As a consequence, the large still image cannot be seen very conveniently on the display of the mobile apparatus.

SUMMARY OF THE INVENTION

It is an object of the invention to propose a method of visualizing a large still picture which is more convenient for the user.

To this end, the method in accordance with the invention is characterized in that it comprises the steps of:
  dividing the large still picture into a set of pieces, said pieces having a size substantially equal to the display size,
  ranking the pieces of the large still picture according to a predetermined scanning order, and
  encoding the set of pieces using a predictive block-based compression technique according to said predetermined scanning order so as to obtain a video sequence.

The method in accordance with the invention allows a large still picture to be converted into a sequence of smaller pictures derived from the large still picture, said smaller pictures corresponding to pieces of the large still picture. Thanks to such a conversion method, a user can see a large still picture in the form of a video sequence automatically generated according to a predetermined scanning pattern. Therefore, such a conversion method makes the visualization of the large still picture much more convenient and much more attractive than the one of the prior art.

According to an embodiment of the invention, the pieces of the large still picture overlap each other and the dividing and ranking steps are based on a traveling shot adapted to cover at least a part of the large still picture. In such a case, the resulting video sequence, when encoded, yields high compression ratios thanks to the intrinsic high level of linear correlations between each piece of the large still picture. Moreover, the encoded video sequence can be smaller than the encoded large still picture depending on the desired image quality.

According to another embodiment of the invention, the conversion method in accordance with the invention further comprises a step of detecting contours within the large still picture. In such a case, the dividing and ranking steps are based on a continuous scanning of the contours detected by the step of detecting contours.

Still according to another embodiment of the invention, the conversion method in accordance with the invention further comprises a step of zooming a part of the large still picture.

The present invention also relates to a device for implementing the conversion method in accordance with the invention.

The present invention finally relates to a computer program product comprising program instructions for implementing said conversion method.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method of and a device for automatically converting a large still picture into a video sequence.

Said conversion method enables users to discover a large still picture piece by piece. It can be used, for example, to discover large images at high resolutions on small screens.

The video sequence is obtained according to the following conversion method. In order to exemplify the following description, let us suppose that we have a large still picture comprising 1024×768 pixels and that we want to display said picture on a screen having a size of 128×128 pixels. The large still picture is, for example, stored in the memory of a remote server or in the memory of a mobile apparatus comprising the screen. Said large still picture is stored either according to an encoded format, for example the JPEG format, or according to a non-encoded or a decoded format.

If the large still picture is stored according to an encoded format, the conversion method in accordance with the invention comprises a step of decoding the encoded large still picture as a function of its encoding format so as to obtain a decoded large still picture.

In a next step, the conversion method comprises a step of dividing the decoded large still picture into a set of pieces of equal size, said pieces having a size which is substantially equal to the screen size, namely 128×128 pixels in our example. It will be apparent to a person skilled in the art that the pieces of the large still picture do not necessary have the same size as the screen size but should have a size which is close to said screen size in order to be easily displayed on said screen, i.e. without any further format conversion process or with a simple one.

Then, in a next step, the conversion method comprises a step of ranking the pieces of the large still picture according to a predetermined scanning order.

Figure 1:
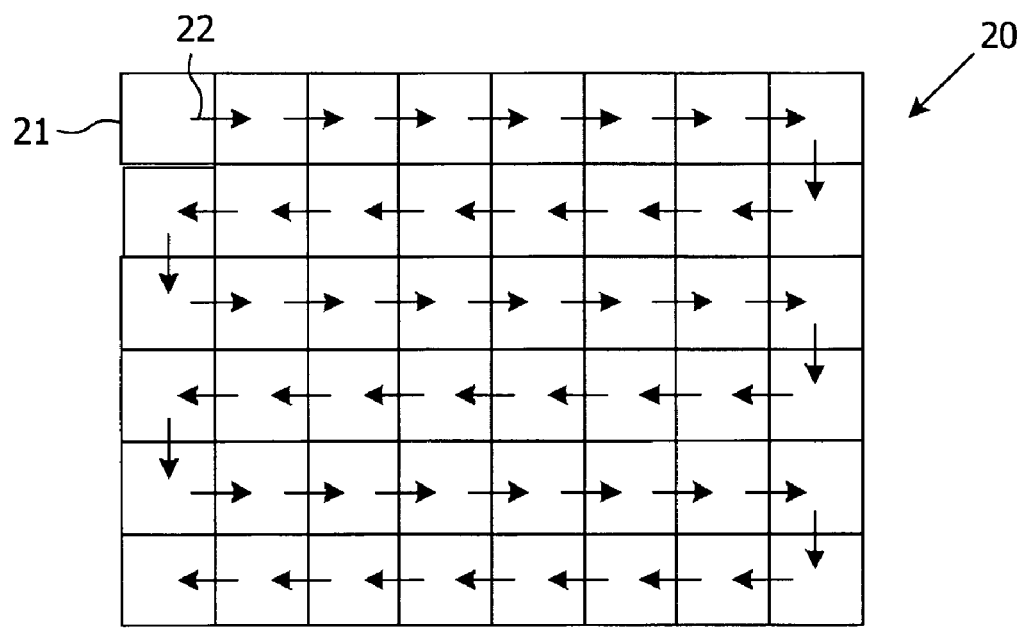
FIG. 1 corresponds to a first embodiment of the implementation of the dividing and scanning steps according to the present invention.

According to a first embodiment of the invention depicted in FIG. 1, the pieces (21) of the large still picture (20) are contiguous, which means that we have a large still picture which has been divided into 48 pieces. In this case, the large still picture is scanned from left to right, then from top to down, them from right to left and so on as shown by the arrows (22). This embodiment is particularly easy to implement.

Figure 2:
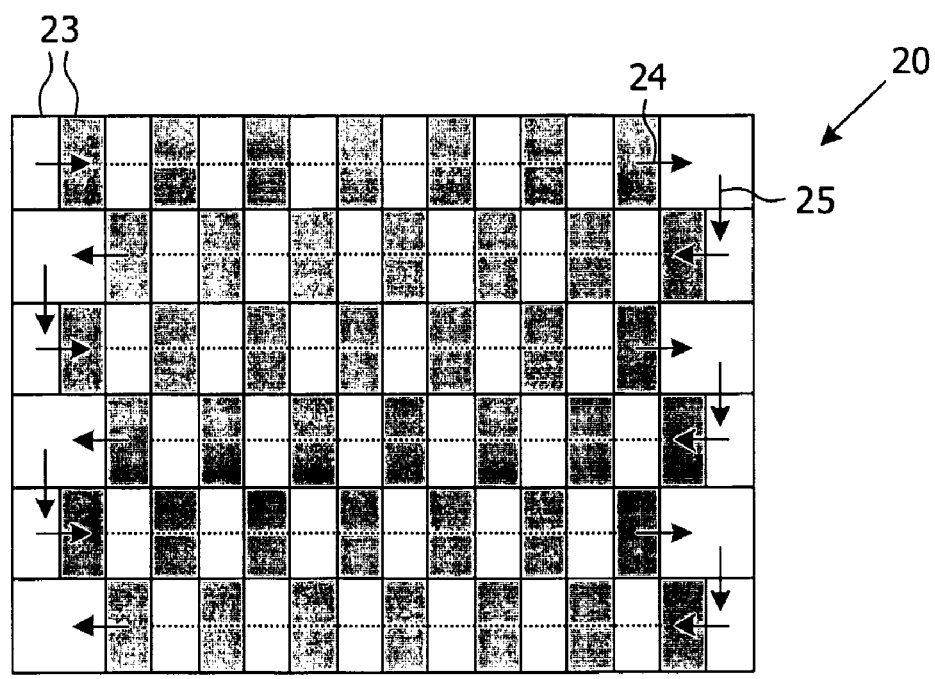
FIG. 2 corresponds to another embodiment of the implementation of the dividing and scanning steps according to the present invention.

According to another embodiment of the invention depicted in FIG. 2, the pieces (23) of the large still picture (20) overlap each other, which means that we have a large still picture which is divided in much more than 48 pieces. For example, if the grid corresponding to a piece of the large still picture is shifted horizontally (24) from half the width of a piece (i.e. 64 pixels in our example) and vertically (25) from the height of a piece (i.e. 128 pixels in our example) at the end of a raw of the large still picture, as illustrated in FIG. 2, 96 pieces are derived. The large still picture is then scanned from left to right, then from top to down, them from right to left and so on as shown by the arrows (24,25). With such an embodiment, the large still picture can be covered in a rather progressive way just like a traveling shot. It will be apparent to a person skilled in the art that the value of the shift can be adjusted both in a horizontal and a vertical direction depending on the traveling effect to be obtained and on the memory size of the video sequence to be achieved.

Figure 3:
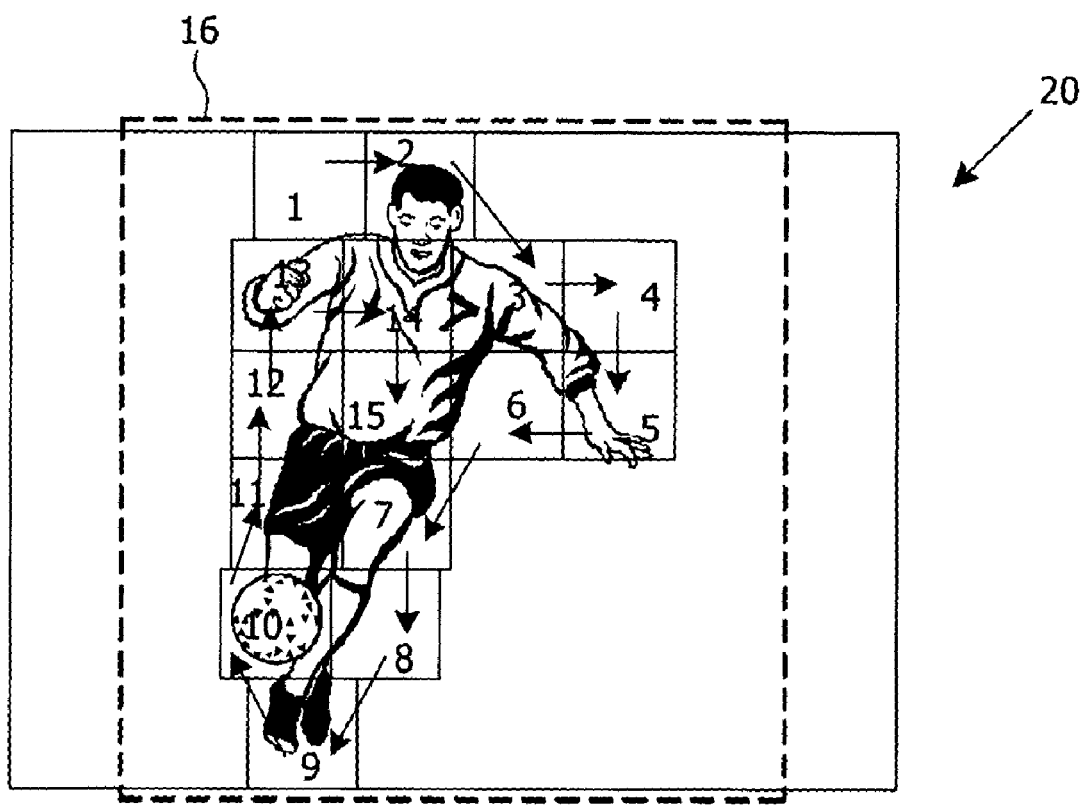
FIG. 3 corresponds to still another embodiment of the implementation of the dividing and scanning steps according to the present invention.

Still according to another embodiment of the invention depicted in FIG. 3, the conversion method in accordance with the invention comprises a step of detecting the contours of at least one object, for example a football player as illustrated in FIG. 3. Said step of detecting contour is based, for example, on the use of a gradient filter or on any other principle known to a person skilled in the art. The dividing step then consists in covering the at least one object with a set of pieces, said pieces being superimposed or being contiguous, as shown in FIG. 3. Then the ranking step defines a specific scanning order (1-15) following, for example, the contours from left to right and from top to bottom until the center of the object is reached, as shown by the arrows. In a final step a zoom out is executed so as to let the viewer discover the whole large still picture which is down-sampled at a lower resolution, said down-sampled picture forming the final picture (16) of the video sequence. Thanks to such an embodiment, only the most interesting or attractive areas of the large still picture are provided to the user in the form of a video sequence.

In the case where the pieces of the large still picture overlap each other, said pieces are shifted according to predetermined horizontal and vertical shifts, as explained before. It will be apparent to a person skilled in the art that the value of the shifts are not necessarily constant but can be variable depending on the content of the large still picture. For example, the shift can be very small when pieces of picture cover the face of the football player or the ball, the traveling shot being slow in this case. Inversely, the shift is bigger when pieces cover other parts of the footballer's body.

It will be apparent to a person skilled in the art that the scanning pattern is by no way limited to the above-described examples. For example, the large still picture is not necessarily entirely covered by a set of pieces nor is said large still picture coverage only limited to a minimum part of the large still picture. As another example, some pieces of the large still picture can have different spatial resolution. It is for example the case if the complete video sequence or a part of it corresponds to a progressive zoom in or zoom out of the large still picture.

Once the scanning pattern has been defined, the conversion method in accordance with the invention comprises a step of encoding the set of pieces of the large still picture using a predictive block-based compression technique according to said scanning order so as to obtain the video sequence. Said encoding step is based, for example, on the MPEG-2 or 4 standard, or on the H.263 or H.264 standard.

It should be noted that the decoding, dividing, ranking, (optionally contour detection) and encoding steps can be performed either by a remote server, the resulting video sequence being sent to a mobile apparatus adapted to play said video sequence, or directly by the mobile apparatus if said apparatus has sufficient memory and computational resources.

For example, if the different steps are performed by the remote server, a content distributor (e.g. a magazine on line) can make a high resolution photography available on its web site in the form of a video sequence, as an alternative or additional feature of the original picture. As another example, if the different steps are performed by the mobile apparatus, the user can convert a large still image into a video sequence and send it to another user, for example using a MMS (Multimedia Message Service).

Therefore, the invention consists in a automatic method by which a user can select a large still picture, select a given scanning pattern, for example one of the above-described scanning pattern and generate the video sequence.

In order to play said video sequence, the mobile apparatus further comprises means for decoding the video sequence as a function of its encoding format, and means for rendering and displaying the decoded video sequence. The result for the user is a very attractive video sequence, which allows the large still picture to be seen in a very convenient way on the display of the mobile apparatus.

The conversion method in accordance with the invention can be implemented by means of items of hardware or software, or both. Said hardware or software items can be implemented in several manners, such as by means of wired electronic circuits or by means of an integrated circuit, e.g. a processor, that is suitable programmed, respectively. The integrated circuit can be contained in a portable apparatus. The integrated circuit comprises a set of instructions. Thus, said set of instructions contained, for example, in a memory of the portable apparatus may cause the integrated circuit to carry out the different steps of the conversion method. The set of instructions may be loaded into the memory by reading a data carrier such as, for example, a disk. A service provider can also make the set of instructions available via a communication network such as, for example, the Internet.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

The invention claimed is:

1. A method of processing a large still picture so as to visualize it on a display having a size smaller than the large still picture, said method comprising the steps of:
   dividing the large still picture into a set of pieces, said pieces having a size substantially equal to the display size, ranking the pieces of the large still picture according to a predetermined scanning order, encoding the set of pieces using a predictive block-based compression technique according to said predetermined scanning order so as to obtain a video sequence, and decoding and displaying the video sequence on the display.

2. The method of claim 1, wherein the pieces of the large still picture overlap each other and wherein the dividing and ranking steps are based on a traveling shot adapted to cover at least a part of the large still picture.

3. The method of claim 1, further comprising a step of detecting contours within the large still picture.

4. The method of claim 3, wherein the dividing and ranking steps are based on a continuous scanning of the contours detected by the step of detecting contours.

5. The method of claim 3, wherein the contours belong to an object, and wherein the ranking step comprises scanning the contours from left to right and from top to bottom until the center of the object is reached.

6. The method of claim 1, further comprising a step of zooming a part of the large still picture.

7. The method of claim 6, wherein the zooming step comprising:

down-sampling the large still picture to generate a down-sampled picture, wherein the down-sampled picture has a lower resolution than the large still picture; and forming a final picture of the video sequence using the down-sampled picture.

8. A non-transitory computer-readable medium embodying a computer program product comprising program instructions for implementing, when said computer program product is executed by a processor, the method of claim 1.

9. The method of claim 1, wherein the ranking step comprises scanning the large still picture from left to right, then from top to down, then from right to left.

10. A device for processing a large still picture so as to visualize it on a display having a size smaller than the large still picture, said device comprising:

said display, means for dividing the large still picture into a set of pieces, said pieces having a size substantially equal to the display size, means for ranking the pieces of the large still picture according to a predetermined scanning order, an encoder for encoding the set of pieces using a predictive block-based compression technique according to said predetermined scanning order so as to obtain a video sequence, and a decoder for decoding and displaying the video sequence on the display.

* * * * *